US000001516H

United States Statutory Invention Registration [19]

[11] Reg. Number: H1516

Ishizaka

[45] Published: Jan. 2, 1996

[54] SILVER HALIDE PHOTOGRAPHIC MATERIAL

[75] Inventor: Tatsuya Ishizaka, Kanagawa, Japan

[73] Assignee: Fuji Photo Film Co., Ltd., Kanagawa, Japan

[21] Appl. No.: 322,393

[22] Filed: Oct. 12, 1994

Related U.S. Application Data

[63] Continuation of Ser. No. 118,594, Sep. 10, 1993, abandoned.

[30] Foreign Application Priority Data

Sep. 11, 1992 [JP] Japan ..... 4-243329

[51] Int. Cl.[6] ..... G03C 1/005

[52] U.S. Cl. ..... 430/567; 430/569; 430/966

[58] Field of Search ..... 430/567, 569, 430/966

[56] References Cited

U.S. PATENT DOCUMENTS 4,847,189 7/1989 Suzuki et al. ..... 430/569

5,230,994 7/1993 Yamada et al. ..... 430/567

4,7660,058 8/1988 Sampei et al. ..... 430/567

*Primary Examiner*—Donald P. Walsh

*Assistant Examiner*—Anthony R. Chi

*Attorney, Agent, or Firm*—Sughrue, Mion, Zinn, Macpeak & Seas

[57] ABSTRACT

A silver halide photographic material comprising a support having provided thereon one or more hydrophilic colloid layers, at least one layer of which is a silver halide emulsion layer comprising a silver halide emulsion containing silver halide grains, wherein the silver halide grains contained in the at least one silver halide emulsion layer have a silver iodide content of not more than 0.5 mol %, the melting time of the silver halide photographic material is at least 30 minutes, and the total thickness of constituent hydrophilic colloid layers per each side of the support having thereon the at least one silver halide emulsion layer is less than 3.8 μm.

13 Claims, No Drawings

SILVER HALIDE PHOTOGRAPHIC MATERIAL

This is a Continuation of Application No. 08/118,594, filed Sep. 10, 1993 now abandoned.

FIELD OF THE INVENTION

The present invention relates to a silver halide photographic material well adapted for rapid processing. In particular, this invention relates to a silver halide photographic material which hardly forms drying marks and roller marks when processed by an automatic processor.

BACKGROUND OF THE INVENTION

Recently, the processing time for photographic materials has been greatly shortened. Hence, a developer providing sufficient sensitivity in a short processing time, and a photographic material having an excellent development progressing property and providing sufficient blackened density in a short processing time, which further provides for a short drying time after washing are desired.

A method generally used for improving the drying property of a photographic material, comprises reducing the water content of the photographic material before the initiation of drying by previously adding a sufficient amount of a hardening agent to the photographic material at the coating step. Consequently, the swelled amounts of the hydrophilic colloid layers including the silver halide emulsion layer(s) in the development, fixing, and washing steps are reduced. In this method, if a larger amount of a hardening agent is used, the drying time can be further shortened. However, in this case, by reducing the swelled amounts of the layers, the development is delayed, the sensitivity and the contrast are lowered, and also the covering power is lowered. Also, if the development progressing property could be improved, the delay of the fixing speed by the high degree of hardening causes problems of increased residual silver, residual hypo, and residual colors of sensitizing dyes, which problems hinder shortening of the processing time.

On the other hand, a method of activating a processing liquid (developer) is known and a method of increasing the amounts of the developing agent and an auxiliary developing agent, increasing the pH of the developer, or increasing the processing temperature is effective. However, these methods disadvantageously deteriorate the stability of the developer with the passage of the time, and are accompanied with an increase in contrast and fog.

For the purpose of overcoming the above described problems, a technique utilizing tabular silver halide grains is proposed in U.S. Pat. Nos. 4,439,520 and 4,425,425.

Also, JP-A-63-305343 and JP-A-1-77047 (the term "JP-A" as used herein means an "unexamined published Japanese patent application") propose a technique of improving the develoment progressing property and the ratio of sensitivity/fog by controlling the development initiating point of silver halide grains having the (111) plane to the apex and/or the edge of the silver halide grain or adjacent thereto.

Furthermore, JP-A-58-111933 discloses a radiographic photographic element having a high covering power without the need for adding a hardening agent at processing, by using tabular silver halide grains and by controlling swelling of the hydrophilic colloid layer(s) to 200% or lower.

These known techniques are all useful for improving the development progressing property of photographic materials. However, when the processing times of each of the development, fixing, and washing steps is shortened, the amounts of residual silver and residual hypo are increased due to reduction of the fixing property in addition to lowering of photographic sensitivity. Also, in a photographic material subjected to spectral sensitization with a sensitizing dye, the problem of residual color formation occurs. On problems other than these photographic properties, there is a limit to improvement by modification of silver halide grains, and layer quality becomes the limiting factor. That is, the thickness of the hydrophilic colloid layer(s) determines the extent of fixing and formation of residual color.

Regarding this point, JP-A-64-73333, JP-A-64-86133, JP-A- 1-105244, JP-A-1-158435, JP-A-1-158436, etc., disclose a means of attaining ultra quick processing so that the total processing time is from 20 seconds to 60 seconds by controlling the gelatin content of a photographic material at the side having the hydrophilic colloids layers including silver halide emulsion layer(s) to the range of from 2.00 to 3.50 g/m$^2$, and by combining this technique with other technical elements. Also, JP-A-2-68537 discloses a means of attaining ultra quick processing by controlling the weight ratio of silver of a light-sensitive silver halide to gelatin (silver/gelatin) in a coated silver halide emulsion layer to at least 1.5.

When the total processing time is set to 60 seconds or lower, and in particular to 40 seconds or lower as described above (as the result of properly distributing the processing time of each of the development, fixing, and washing steps), the present inventor found that if the thickness of the layers constituting the photographic material (hereinafter, referred to as layer thickness) was not less than 3.8 μm, the drying property was impaired when the automatic processor was located in a highly humid environment.

As described above, when the layer thickness is less than 3.8 μm, the formation of drying marks and roller marks in the case of processing with an automatic processor becomes inferior, and finally reaches an unacceptable level.

The drying mark is manifest as a non uniform unevenness of surface luster formed at drying in the case of processing by an automatic processor. If drying marks form, when the photographic material is evaluated in a room having an illumination such as a fluorescent lamp, etc., an unevenness is apparent in the reflected light from the photographic material. Consequently, the image formed on photographic material becomes reluctant to be evaluated.

Also, roller marks are incurred when pressure is applied to a light-sensitive material by the fine unevenness on the surfaces of transporting rollers of an automatic processor which results in a black spot-form of uneven density.

The present invention reduces both the formation of drying marks and roller marks for a layer thickness of less than 3.8 μm (which layer thickness is ordinarily susceptible to such drying and roller marks) to enable rapid processing. In the present invention, the foregoing object is achieved by increasing the melting time of the photographic material and by greatly reducing the iodide content of the silver halide grains used therein.

JP-A-63-221341 discloses a means of improving the pressure property and the graininess for an ultra rapid total processing time of from 20 seconds to 60 seconds by controlling the coated gelatin amount to a range of from 2.00 to 3.20 g/m$^2$, controlling the melting time to a range of 8 minutes to 45 minutes, and using tabular silver halide grains having a grain diameter of 5 times the thickness of the grain. Furthermore, JP-A-2-262645 discloses a technique which enables rapid processing and achieves high-sensitivity and good processing properties by defining the content of silver iodide, the melting time, and the layer thickness.

The effects of the techniques described in the foregoing patent publications are entirely different from the effect of the present invention as described hereinbelow.

Furthermore, the silver iodide contents described in the Examples of the foregoing JP-A-63-221341 are 2.0 mol %, 1.3 mol %, and 0.67 mol % to silver, and the silver iodide content described in the Examples of foregoing JP-A-2-262645 are 2.2 mol % and 10.5 mol % to silver.

When silver halide grains having such a silver iodide content are used in the present invention, the formation of roller marks is severe, and the photographic material is not acceptable for practical use.

SUMMARY OF THE INVENTION

The object of the present invention is to provide a photographic material which forms fewer roller marks when subjected to ultra rapid processing and which forms fewer drying marks when processed using an automatic processor.

The present inventor has discovered that the objective is achieved by providing a silver halide photographic material comprising a support having provided thereon one or more hydrophilic colloid layers, at least one layer of which is a silver halide emulsion layer, comprising a silver halide emulsion containing silver halide grains, wherein the silver halide grains in the at least one silver halide emulsion layer have a silver iodide content of not more than 0.5 mol %, the melting time of the silver halide photographic material is at least 30 minutes, and the total thickness of constituent hydrophilic colloid layer(s) per each side of the support having thereon the at least one silver halide emulsion layer is less than 3.8 μm.

In accordance with a second embodiment of the present invention, the silver halide photographic material comprises the above described silver halide emulsion layer on both sides of the support.

In accordance with a third embodiment of the present invention, at least 50% of the silver halide grains of the above described silver halide emulsion layer are composed of tabular silver halide grains having an aspect ratio of at least 3.

DETAILED DESCRIPTION OF THE INVENTION

The present invention is described in detail below.

The silver halide grains constituting the silver halide emulsion of the present invention can comprise silver bromide, silver iodobromide, silver iodochlorobromide and silver chlorobromide. To achieve high sensitivity, the silver chloride content is preferably not more than 10 mol %. The silver halide grains may be composed of an uniform phase, but silver halide grains having a halogen composition of the inside (core) portion different from the surface (shell) is preferred, and silver halide grains containing at least 80 mol % (more preferably at least 90 mol %) silver bromide and having a silver iodide-containing phase as the uppermost surface (shell portion) thereof are particularly preferred.

The coated silver amount is preferably from 1.5 to 2.2 $g/m^2$, more preferably from 1.6 to 1.9 $g/m^2$ per one side of the support.

The silver iodide content of the silver halide grains for use in the present invention is not more than 0.5 mol %, preferably not more than 0.3 mol %, more preferably not more than 0.15 mol %, and particularly preferably from 0.01 to 0.15 mol %.

The halogen composition of silver halide grains in a silver halide emulsion may be measured using a powder X-ray diffraction method as described,. e.g., in JP-A-56-110926.

The average silver iodide content of all of the silver halide grains contained in the silver halide emulsion of the present invention is not more than 0.5 mol %, preferably not more than 0.3 mol %, and more preferably from 0.01 to 0.15 mol % to silver.

Also, tabular silver halide grains having an aspect ratio of at least 3, which are preferably used in the present invention, are descibed in detail, e.g., in *Research Disclosure,* Vol. 225, Item 22534, pages 20 to 58 (January, 1983), JP-A-58-127921, and JP-A-58-113926.

Tabular silver halide grains can be prepared by properly combining methods known in this field of art.

A tabular grain silver halide emulsion for use in the present invention is described in Cugnac and Chateau, "Evolution of the Morphology of Silver Bromide Crystals During Physical Ripening", *Science et Industrie Photography,* vol. 33, No. 2 (1962), pages 121 to 125, Duffin, *Photographic Emulsion Chemistry,* pages 66 to 72, published by Focal Press, New York, 1966, and A. P. H. Triveli and W. F. Smith, *Photographic Journal,* Vol. 80, 285(1940), and can be easily prepared by the methods described, e.g., in JP-A-58-127921, JP-A-58-113927, JP-A-58- 113928, and U.S. Pat. No. 4,439,520.

The diameter of the projected area of the tabular silver halide grains for use in the present invention is preferably from 0.3 to 2.0 μm, and particularly preferably from 0.5 to 1.2 μm. Also, the distance between parallel planes of the tabular silver halide grains (thickness of the grains) is preferably from 0.05 μm to 0.3 μm, and particularly preferably from 0.1 to 0.25 μm, and the aspect ratio of the tabular silver halide grains is preferably from 3 to less than 20, and particularly preferably from 4 to less than 8.

In the tabular grain silver halide emulsion of the present invention, tabular silver halide grains having an aspect ratio of at least 3 preferably account for at least 50% (projected area), particularly at least 70% of the total silver halide grains, and the average aspect ratio of the tabular silver halide grains is preferably at least 3, particularly preferably from 4 to 8.

In the tabular silver halide emulsion, monodisperse hexagonal tabular silver halide grains are particularly useful in the present invention.

The details of the structure and the production method of the monodisperse hexagonal tabular silver halide grains for use in the present invention are described in JP-A-63-151618.

The present invention reduces drying marks caused by thinning the layer thickness of a photographic material such that super quick processing becomes possible, in particular, drying marks of a photographic material of the type having a silver halide emulsion layer on both the surface thereof, by prolonging the melting time of the photographic material.

The melting time of the silver halide photographic material is at least 30 minutes, preferably not less than 45 minutes. The longer the melting time is, the more drying marks are reduced. The melting time is adjusted by increasing the ratio of the amount of the hardening agent to the amount of the hydrophilic colloid such as gelatin. The hardening agent is preferably present on the support so that the ratio by weight of the amount of the hardening agent to the total amount of the hydrophilic colloid coated on each surface of the support is at least $1.4\times10^{-2}$, more preferably at least $1.7\times10^{-2}$.

The melting time in the present invention is the time when the first of silver halide emulsion layers constituting a photographic material cut into a 1 cm×2 cm piece begins to melt when the photographic material is immersed in an aqueous solution of 1.5% by weight of sodium hydroxide at 50° C.

The layer thickness in this invention is the thickness of all of the hydrophilic colloid layers coated per each side of the support of a photographic material. In this case, the hydrophilic colloid layers include at least one light-sensitive silver halide emulsion layer and optionally light-insensitive hydrophlic colloid layers such as an interlayer, a protective layer, etc. If an undercoat layer is formed on the support, the thickness of the undercoat layer is also included in the layer thickness.

The layer thickness in the present invention is determined from a photograph obtained by observing a cut piece (cross section) of a silver halide photographic material with a scanning type electron microscope (SEM). The distance from the upper surface of the support to the top surface of the uppermost hydrophilic colloid layer is the layer thickness. Local unevennes formed by using a matting agent, etc., is not included in the layer thickness.

The layer thickness per each side of the support having thereon the silver halide emulsion layer is less than 3.8 μm, preferably less than 3.6 μm, and more preferably less than 3.4 μm, with the preferred lower limit being 2.6 μm.

The photographic material according to the present invention may have a silver halide emulsion layer(s) on both sides or one side of the support. When the photographic material has the silver halide emulsion layer on only one side, the layer thickness on the side of the support not having thereon the silver halide emulsion layer is preferably not more than 3.6 μm.

As the binder or protective colloid for use in the silver halide emulsion layers, the interlayer, and the surface protective layer of the photographic material of the present invention, gelatin is generally used, but hydrophilic colloids other than gelatin can also be used.

Useful hydrophilic colloids other than gelatin include, for example, proteins, such as gelatin derivatives, graft polymers of gelatin and other polymers, albumin, casein, etc.; cellulose derivatives such as hydroxyethyl cellulose, carboxymethyl cellulose, cellulose sulfuric acid esters, etc.; saccharide derivatives such as sodium alginate, dextran, starch derivatives, etc.; and various synthetic hydrophilic high molecular materials, e.g., homopolymers and copolymers such as polyvinyl alcohol, polyvinyl alcohol partial acetal, poly-N-vinyl pyrrolidone, polyacrylic acid, polymethacrylic acid, polyacrylamide, polyvinyl imidazole, polyvinyl pyrazole, etc.

The silver halide photographic emulsion and the light-insensitive hydrophilic colloid in the present invention may contain an inorganic or organic hardening agent such as, for example, chromium salts (chromium alum, chromium acetate, etc.), aldehydes (formaldehyde, glyoxal, glutaraldehyde, etc.), N-methylol compounds (dimethylolurea, methyloldimethyl hydantoin, etc.), dioxane derivatives (2,3-dihydroxydioxane, etc.), active vinyl compounds (1,3,5-triacryloyl-hexahydro-s-triazine, bis(vinylsulfonyl) methyl ether, N,N'-methylenebis-(β -(vinylsulfonyl)propionamide), etc.), active halogen compounds (2,4-dichloro-6-hydroxy-s-triazine, etc.), mucohalogenic acids (mucochloric acid, mucophenoxychloric acid, etc.), iso-oxazoles, dialdehyde starch, and 2-chloro-6-hydroxytriazinylated gelatin. The hardening agents can be used singly or as a combination thereof. Of these hardening agents, the active vinyl compounds described in JP-A-53-41221, JP-A-53- 57257, JP-A-59-162546, and JP-A-60-80846 and the active halides described in U.S. Pat. No. 3,325,287 are preferable.

As the hardening agent in the present invention, high molecular weight hardening agents can be effectively utilized.

The high molecular weight hardening agent for use in the present invention includes, for example, dialdehyde starch, polyacrolein, the polymers having an aldehyde group, such as the acrolein copolymer described in U.S. Pat. No. 3,396,029, the polymer having an epoxy group described in U.S. Pat. No. 3,623,878, the polymer having a dichlorotriazine group described in *Research Disclosure,* No. 17333 (1978), the polymer having an acvtive ester group described in JP-A-56-66841, and the polymers each having an active vinyl group or a precursor for an active vinyl group described in JP-A-56-142524, U.S. Pat. No. 4,161,407, JP-A-54-65033, *Research Disclosure,* No. 16725 (1978). In these high molecular weight hardening agents, the polymers each having an active vinyl group or a precursor for an active vinyl group are preferable, and the polymer wherein an active vinyl group or the precursor for an active vinyl group is bonded to the polymer main chain with a long spacer described in JP-A-56-142524 is particularly preferable.

For obtaining the specified melting time in the present invention, the foregoing hardening agent can be used in an amount so long as the effects of the present invention are obtained.

Furthermore, the hydrophilic colloid layers (including the silver halide emulsion layers) of the photographic material of the present invention preferably comprise both hydrophilic colloids other than gelatin and gelatin so that the swelling ratio of the layers in water becomes 280% or lower, and particularly from 200 to 280%.

The swelling ratio of the layers in water in the present invention can be measured by a lyophilization method.

That is, after storing the photoraphic light-sensitive material of the present invention for 7 days under conditions of 25° C., 60% RH, the swelling ratio of the hydrophilic colloid layers thereof is measured. The dry thickness (b) is determined by the scanning electron microscopic photograph of the cut piece of the photographic material. The swelled layer thickness (c) is determined by immersing the photographic material in distilled water at 21° C. for 3 minutes and after lyophilizing the photographic material with liquid nitrogen, measuring the thickness with a scanning electron microscopic.

The swelling ratio is the value of $\{(c)-(b)\}/(b)\times 100(\%)$.

There are no particular restrictions on the various additives for use in the photographic material of the present invention and for example, the additives described in the noted portions of the following publications can be used.

| Item | Described Portion |
|---|---|
| 1) Silver halide emulsion and the production method | JP-A-2-68539, page 8, right lower column line 6 from the bottom to page 10, right upper column, line 12; JP-A-3-24537, page 2, right upper column line 10 to page 6 right upper column, line 1 and page 10, left upper clumn, line 16 to page 11, left lower column, line 19; and JP-A-4-107442. |

-continued

| Item | Described Portion |
|---|---|
| 2) Chemical sensitizing method | JP-A-2-68539, page 10, right upper column, line 13 to left column, line 16; and Japanese Patent Application No. 3-105035. |
| 3) Antifoggant and stabilizer | JP-A-2-68539, page 10, left lower column, line 17 to page 11, left upper column, line 7 and page 3, left upper column, line 2 to page 4, left lower column. |
| 4) Tone improving agent | JP-A-62-276539, page 2, left column, line 7 to page 10, left lower column, line 20; and JP-A-3-94249, page 6, left lower column, line 15 to page 11 right upper column, line 19. |
| 5) Spectral sensitizing dye | JP-A-2-68539, page 4, right lower column, line 4 to page 8, right lower column. |
| 6) Surface active agent and antistatic agent | JP-A-2-68539, page 11, left upper column, line 14 to page 12, left upper column, line 9. |
| 7) Matting agent, lubricant, and plasticizer | JP-A-2-68539, page 12, left upper column, line 10 to right upper column, line 10 and page 14, left lower column, line 10 to right lower column, line 1. |
| 8) Hydrophilic colloid | JP-A-2-68539, page 12, right upper column, line 11 to left lower column, line 16. |
| 9) Hardening agent | JP-A-2-68539, page 12, left lower column, line 17 to page 13, right upper column, line 6. |
| 10) Support | JP-A-2-68539, page 13, right upper column, lines 7 to 20. |
| 11) Crossover cut method | JP-A-2-264944, page 4, right upper column, line 20 to page 14, right upper column. |
| 12) Dye and mordant | JP-A-2-68539, page 13, left lower column, line 1 to page 14, left lower column, line 9 and JP-A-3-24537, page 14, left lower column to page 16, right lower column. |
| 13) Polyhydroxybenzenes | JP-A-3-39948, page 11, left upper column to page 12, left column and European Patent 452,772A. |
| 14) Layer structure | JP-A-3-198041 |
| 15) Photographic processing | JP-A-2-103037, page 16, right upper column, line 7 to page 19, left lower column, line 15 and JP-A-2-115837, page 3, right lower column, line 5 to page 6, right upper column, line 10 |

Next, the present invention is more practically described by the following Examples.

EXAMPLE 1

Preparation of Tabular Pure Silver Bromide Grains (Grain 1).

A mixture of 1 liter of water, 6 g of potassium bromide, and 7 g of gelatin was placed in a vessel kept at 55° C. and 37 ml of an aqueous silver nitrate solution (4.00 g of silver nitrate) and 38 ml of an aqueous solution containing 5.7 g of potassium bromide were added to the mixture with stirring by a double jet method over a period of 37 seconds. Then, after adding thereto 18.6 g of gelatin, the temperature of the mixture was raised to 70° C. and 89 ml of an aqueous silver nitrate solution (9.8 g of silver nitrate) was added to the mixture over a period of 22 minutes. Then, 7 ml of an aqueous 25% ammonia solution was added thereto, and after physically ripening the reaction mixture for 10 minutes at the same temperature, 6.5 g of glacial acetic acid was added thereto. Thereafter, an aqueous solution containing 153.0 g of silver nitrate and an aqueous solution of potassium bromide were added to the mixture by a controlled double jet method while keeping the pAg at 8.5 over a period of 35 minutes. Then, after adjusting pBr of the mixture to 2.8 using an aqueous silver nitrate solution, 15 ml of an aqueous solution of 2N potassium thiocyanate was added. After carrying out physical ripening for 5 minutes at the same temperature, the temperature of the mixture was lowered to 35° C. Thus, monodisperse tabular pure silver bromide grains having an average projeced area diameter of 1.11 μm, a thickness of 0.164 μm, and a variation coefficient of diameters of 18.0% were obtained.

Thereafter, soluble salts were removed by a flocculaion method. Then, the temperature of the silver halide grains was rainsed to 40° C. again and after adding thereto 30 g of gelatin, 2.35 g of phenoxy ethanol and 0.8 g of polystyrene sodium sulfonate as a thickener, the pH and pAg thereof were adjusted to 5.90 and 8.25, respectively with an aquous sodium hydroxide solution and an aqueous silver nitrate solution.

Preparation of Emulsion 1: Chemical Sensitization

Next, chemical sensitization was applied to the grain 1 described above with stirring at a constant temperature of 56° C. First, 7.2 mg of sodium thiosulfonate and silver iodide fine grains having a mean grain size of 0.07 μm in an amount of 0.1 mol % to the total silver amount were added to the silver halide grains (the grain 1). Then, 20 mg of 4-hydroxy-6 -methyl-1,3,3a,7-tetrazaindene, 400 mg of the sensitizing dye I- 1, and 4.2 mg of the sensitizing dye I-2 shown below were added to the silver halide grains. Furthermore, 0.83 g of an aqueous solution of calcium chloride was added thereto. Thereafter, 1.3 mg of sodium thiosulfate, 3.4 mg of the selenium compound-1 shown below, 2.6 mg of chloroauric acid, and 90 mg of potassium thiocyanate were added thereto and after 40 minutes, the resultant mixture was cooled to 35° C.

I-1

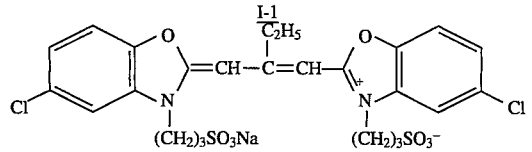

I-2

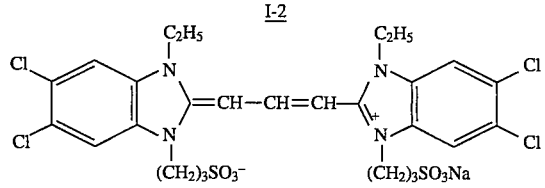

SeleniumCompound-1

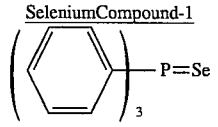

Preparation of Coating Composition for Emulsion Layer

To Emulsion 1 thus subjected to chemical sensitization were added the following components in the amounts shown below per mol of the silver halide to provide a coating composition (Type A).

| | |
|---|---|
| 2-Bis(hydroxyamino)-4-diethylamino-1,3,5-triazine | 72 mg |
| Trimethylolpropane | 9 g |
| Dextran (average molecular weight 39,000) | 13.1 g |
| Potassium polystyrenesulfonate (average molecular weight 600,000) | 1.8 g |
| Compound (E-1) (shown below) | 3.4 mg |

-continued

| | |
|---|---|
| Compound (E-2) (shown below) | 4.8 g |
| SNOWTEX C (trade name, made by Nissan Chemical Industries, Ltd.) and comprising colloidal silica | 29.1 g |

Gelatin: The amount was adjusted so that the total amount thereof coated on one side of the support was 2.4 g/m$^2$.

Hardening agent (1,2-bis(vinylsulfonylacetamido)ethane)

The amount of the hardening agent was adjusted to provide a melting time as shown in Table 1 below. For example, the hardening agent for Sample 3 was added such that the amount ratio by weight of the hardening agent to gelatin present on each side of the support was $1.8\times10^{-2}$.

Compound(E-1)

-continued

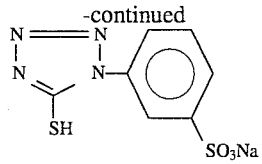

Compound(E-2)

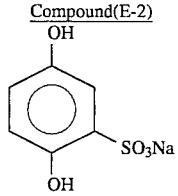

Preparation of Coating Composition for Surface Protective Layer

The coating composition for the surface protective layer was prepared using the following components at the coating amounts shown below.

| | |
|---|---|
| Gelatin | 0.812 g/m$^2$ |
| Sodium polyacrylate (average molecular weight 400,000) The amount thereof was adjusted to provide a swelling ratio of 230%. | |
| Compound (P-1) | 0.013 g/m$^2$ |
| Compound (P-2) | 0.045 g/m$^2$ |
| Compound (P-3) | 0.0065 g/m$^2$ |
| Compound (P-4) | 0.003 g/m$^2$ |
| Compound (P-5) | 0.001 g/m$^2$ |
| Compound (P-6) | 0.0012 g/m$^2$ |
| Polymethyl Methacrylate (mean particle size 3.7 μm) | 0.087 g/m$^2$ |
| PROXEL (a preservative) (pH adjusted to 7.4 with NaOH) | 0.0005 g/m$^2$ |

Compound (P-1)

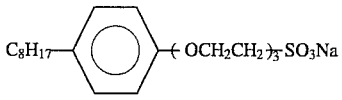

Compound (P-2)

$C_{18}H_{33}O(CH_2O)_{10}H$

Compound (P-3)

$C_{17}H_{33}CON(CH_3)CH_2CH_2SO_3Na$

Compound (P-4)

$C_8F_{17}SO_2N(C_3H_7)(CH_2CH_2O)_{15}H$

Compound (P-5)

$C_8F_{17}SO_2N(C_3H_7)(CH_2CH_2O)_4(CH_2)_4SO_3Na$

Compound (P-6)

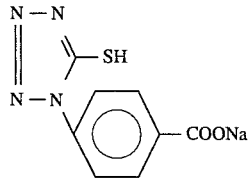

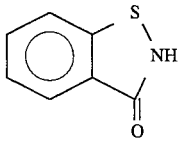

Preparation of Support (1) Preparation of Dye Dispersion K for Undercoat Layer:

The dye shown below was subjected to a ball mill treatment by the method described in JP-A-63-197943.

Dye:

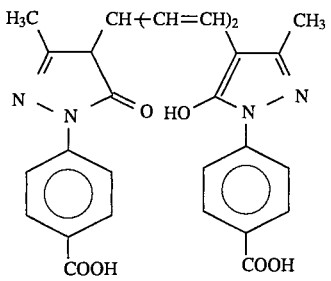

In a 2 liter ball mill were placed 434 ml of water and 791 ml of an aqueous solution of 6.7 wt % Triton X-200 (trade name), i.e., surface active agent, and 20 g of the dye was added to the solution. Then, 400 ml of zirconium oxide (ZrO) beads (diameter 2 mm) were added to the ball mill and the content in the ball mill was ground for 4 days. Thereafter, 160 g of 12.5% gelatin was added thereto. After defoaming, the ZrO beads were removed by filtration. When the dye dispersion obtained was observed, the diameters of the ground dye had a wide distribution of from 0.05 to 1.15 μm and the mean particle size was 0.37 μm.

Furthermore, by carrying out a centrifugal separation, dye particles larger than 0.9 μm were removed.

Thus, the dye dispersion K was obtained.

(2) Preparation of Support

After applying a corona discharge treatment to a biaxially stretched polyethylene terephthalate film having a thickness of 183 μm, the 1st coating liquid having the following composition was coated on the film at a coated amount of 5.1 ml/m$^2$ by a wire bar coater and dried at 175° C. for one minute.

Then, the 1st coating liquid was also coated on the opposite side of the support in the same manner as described above.

In this case, the polyethylene terephthalate film used contained 0.04% by weight of the dye having the following structure.

Dye:

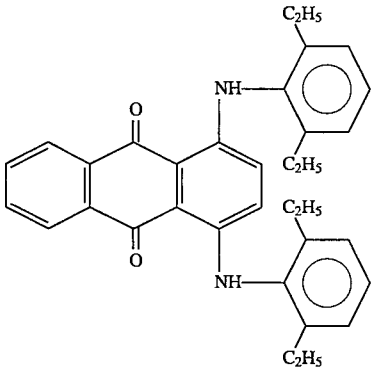

The 1st undercoat layer coating composition:

| | |
|---|---|
| Butadiene-styrene copolymer latex solution (solid conponents 40 wt %, butadiene/styrene = 31/36 by weight ratio) | 79 ml |
| Aqueous solution of 4% 2,4-dichloro-6-hydroxy-s-triazine sodium salt | 20.5 ml |
| Distilled water | 900.5 ml |

For the latex solution described above, the following emulsion dispersing agent was used.

EmulsionDispersingAgent

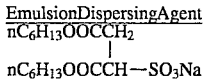

The latex solution contained the above dispersing agent in an amount of 0.4% by weight to the solid contents of the latex.

Then, the 2nd undercoat coating layer having the composition shown below was coated on each of the 1st undercoat layers formed on both the surfaces of the support described above by a wire bar coater system at the coated amounts (for one layer) shown below and dried at 150° C.

| | | |
|---|---|---|
| Gelatin | | 160 mg/m$^2$ |
| Dye Dispersion K (26 mg/m$^2$ as the dye solid compnent) | | |
| 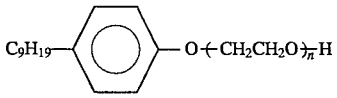 | (n = 8.5) | 8 mg/m$^2$ |
| 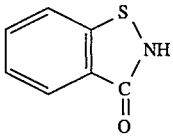 | | 0.27 mg/m$^2$ |
| Matting Agent: Polymethyl methacrylate having a mean particle size of 2.5 μm | | 2.5 mg/m$^2$ |

Preparation of Photographic Material

On both the surfaces of the undercoat layers formed on the support were coated the foregoing silver halide emulsion layer and the surface protective layer by a simultaneous extrusion method. The coated silver amount per each side of the support was 1.70 g/m$^2$.

Thus, Samples 1 to 7 were obtained.

Evaluation of Photographic Performance

Both sides of each of the photographic materials thus prepared were exposed to light for 0.05 seconds using an X-ray ortho screen HR-4 (trade name, made by Fuji Photo Film Co., Ltd.). After light expopsure, the photographic material was processed a described below and then the sensitivity was measured. The sensitivity is shown as the reciprocal of the ratio of the exposure amount giving a density of fog+1.0 relative to the sensitivity of Sample 1.

Processing

Automatic processor: CEPROS-M (trade name, made by Fuji Photo Film Co., Ltd.) modified to increase the transporting speed to 30 seconds dry-to-dry time.

| Preparation of Concentrated Liquids: | |
|---|---|
| (Developer) | |
| Part Liquid A: | |
| Potassium Hydroxide | 330 g |
| Potassium Sulfite | 630 g |
| Sodium Sulfite | 255 g |
| Potassium Carbonate | 90 g |
| Boric Acid | 45 g |
| Diethylene Glycol | 180 g |
| Diethylenetriaminepentaacetic Acid | 30 g |
| 1-(N,N-Diethylamine)ethyl-5-mercaptotetrazole | 0.75 g |
| Hydroquinone | 450 g |
| 4-Hydroxymethyl-4-methyl-1-phenyl-3-pyrazolidone | 60 g |
| Water to make | 4125 ml |
| Part Liquid B: | |
| Diethylene Glycol | 525 g |
| 3,3'-Dithiobishydrocinnamic Acid | 3 g |
| Glacial Acetic Acid | 102.6 g |
| 2-Nitroindazole | 3.75 g |
| 1-Phenyl-3-pyrazolidone | 34.5 g |
| Water to make | 750 ml |
| Part Liquid C: | |
| Glutar aldehyde (50 wt./wt %) | 150 g |
| Potassium Bromide | 15 g |
| Potassium Metabisulfite | 105 g |
| Water to make | 750 ml |
| (Concentrated Fix Solution) | |
| Ammonium Thiosulfate (70 wt./vol. %) | 3000 ml |
| Ethylenediaminetetraacetic Acid.Disodium.dihydrate | 0.45 g |
| Sodium Sulfite | 225 g |
| Boric Acid | 60 g |
| 1-(N,N-Diethylamine)-ethyl-5-mercaptotetrazole | 15 g |
| Tartaric Acid | 48 g |
| Glacial Acetic Acid | 675 g |
| Sodium Hydroxide | 225 g |
| Sulfuric Acid (36 N) | 58.5 g |
| Aluminum Sulfate | 150 g |
| Water to make | 6000 ml |
| pH | 4.68 |

Preparation of Processing Solutions

Each of the liquid parts of the foregoing concentrated developer was filled in a separate container. The containers containing liquid parts A, B, and C were connected to one another.

Also, the foregoing concentrated fix solution was filled in a container.

First, 300 ml of an aqueous solution containing 54 g of acetic acid and 55.5 g of potassium bromide was added to the developing tank as a starter.

Each of the containers containing the foregoing processing compositions was inverted. Also, each container was placed on each stock tank for a processing solution mounted to the side of the automatic processor so that the punching blade of each stock tank was inserted into the container to break the sealing film of the cap of the container. The processing compositions of the respective containers were thereby filled in each stock tank.

Each of these processing compositions was filled in the developing tank and the fixing tank of the automatic processor in the ratios shown below by working delivery pumps disposed in the automatic processor.

Also, every time 8 photographic materials having a size of 10×12 $in^2$ were processed, each processing composition was mixed with water at the foregoing ratio and suppplied to each processing tank of the automatic processor.

| Developer: | |
|---|---|
| Part Liquid A | 51 ml |
| Part Liquid B | 10 ml |
| Part Liquid C | 10 ml |
| Water | 125 ml |
| pH | 10.50 |
| Fix Solution: | |
| Concentrated Fix Solution shown above | 80 ml |
| Water | 120 ml |
| pH | 4.62 |

Also, city water was filled in the wash tank of the automatic processor.

Three polyethylene bottles each containing 0.4 g of perlite having a mean particle size of 100 μm and mean pore size of 3 μm carrying ray fungi (the opening of each bottle was covered by a 300 mesh nylon cloth so that water and fungi could pass through the cloth) were prepared as slime preventing agents. Two bottles were placed on the bottom of the wash tank and one bottle was placed on the bottom of the stock tank (liquid amount 0.2 liter) for wash water.

| Processing Speed and Processing Temperature: | | |
|---|---|---|
| Development | 35° C. | 8.8 seconds |
| Fixing | 32° C. | 7.7 seconds |
| Washing | 17° C. | 3.8 seconds |
| Squeeze | | 4.4 seconds |
| Drying | 58° C. | 5.3 seconds |
| Total | | 30 seconds |
| Replenishing Amount: | | |
| Developer | | 25 ml/10 × 12 $in^2$ sheet processed |
| Fix Solution | | 25 ml/10 × 12 $in^2$ sheet processed |

Evaluation of Drying Marks

The reflection luster unevenness of each processed sample at the outlet of the drying zone of the automatic processor was evaluated. The evalution was made by the following functional evaluation.

A: Drying marks were hardly observed.

B: Drying marks were slightly observed, but were not problematic.

C: Drying marks were observed, but at an acceptable level for practical use.

D: Drying marks were generated at an unacceptable level for practical use.

Evaluation of Roller Marks

Each of the photographic materials 1 to 16 was cut into 30.5 cm×25.4 cm portions, and were exposed to light on one side thereof using a light source having a color temperature of 5,400° K. In this case, by controlling the exposure time, the density in processing for the roller mark evaluation was controlled so that the density of each sample including the base density was 1.0. The level of black spot-form roller marks observed on each sample processed as descrbed above were evaluated. The evaluation was made by the following functional evaluation.

A: Roller marks were hardly observed.

B: Roller marks were slightly observed, but were not problematic.

C: Roller marks were observed, but at an acceptable level for practical use.

D: Many roller marks were generate, and the resulting density unevenness was large (unsuitable for practical use).

The results obtained are shown in Table 1 below.

TABLE 1

| Sample | Emulsion | Layer Thickness (μm) | Melting Time (min.) | Drying marks | Photographic Property | Roller marks |
|---|---|---|---|---|---|---|
| 1 (Comparison) | 1 | 3.3 | 15 | D | 1.00 | B |
| 2 (Comparison) | " | " | 25 | D | " | B |
| 3 (Invention) | " | " | 33 | C | " | B |
| 4 (Invention) | " | 3.4 | 45 | B | " | B |
| 5 (Invention) | " | " | 70 | A | 0.99 | B |

As shown in Table 1, when the layer thickness is controlled to less than 3.8 μm, in the coated samples having a melting time of at least 30 minutes, drying marks were formed in an allowable range without lowering the photographic property (sensitivity). These results clearly show the excellent effects of the present invention.

EXAMPLE 2

Preparation of Tabular Silver Iodobromide Grains (Grain 2) Haing a Total Silver Iodide Content of 1.3 mol %

A mixture of 1 liter of water, 6 g of potassium bromide, and 7 g of gelatin was placed in a vessel kept at 55° C. and 37 ml of an aqueous silver nitrate solution (4.00 g of silver nitrate) and 38 ml of an aqueous solution containing 5.7 g of potassium bromide were added to the mixture in the vessel with stirring by a double jet method over a period of 37 seconds. Then, after adding thereto 18.6 g of gelatin, the temperature of the mixture was raised to 70° C. and 89 ml of an aqueous silver nitrate solution (9.8 g of silver nitrate) was added to the mixture over a period of 22 minutes. Then, 7 ml of an aqueous solution of 25% ammonia was added to the mixture and after carrying out physical ripening for 10 minutes at the temperature, 6.5 ml of glacial acetic acid was added thereto. Thereafter, an aqueous solution of 153.0 g of silver nitrate, an aqueous solution of potassium bromide, and an aqueous solution of potassium iodide in an amount such that the silver iodide content was 1.2 mol % of the total silver amount were added to the mixture by a controlled double jet method while maintaining pAg at 8.5 over a period of 35 minutes. Directly after finishing the addition of these solutions, silver iodide fine grains having a mean grain size of 0.07 μm were added thereto in an amount of 0.1 mol % to the total silver amount. Then, after adjusting pBr to 2.8 using an aqueous silver nitrate solution, 15 ml of an aqueous solution of 2N potassium thiocyanate was added. After carrying out physical ripening for 5 minutes at the same temperature, the temperature of the mixture was lowered to 35° C. Thus, monodisperse tabular silver iodobromide grains having a total silver iodide content of 1.3 mol %, an average projected area diameter of 1.11 μm, a thickness of 0.164 μm, and a variation coefficient of diameters of 18.0% were obtained.

Thereafter, soluble salts were removed by a flocculation method. The temperature of the silver halide grains was raised to 40° C. again, and after adding thereto 30 g of gelatin, 2.35 g of phenoxy ethanol, and 0.8 g of sodium polystyrenesulfonate as a thickener, the pH and pAg thereof were adjusted to 5.90 and 8.25, respectively with an aqueous sodium hydroxide solution and an aqueous silver nitrate solution.

Preparation of Grain 3

The same procedure used to prepare the grain 2 was followed, except that the aqueous solution of potassium iodide added by the controlled double jet method was added in an amount such that the silver iodide content was 0.57 mol % of the total silver amount. Thus, monodisperse tabular silver iodobromide grains having a total silver iodide content of 0.67 mol %, an average projected area diameter of 1.12 μm, a thickness of 0.163 μm, and a variation coefficient of diameters of 18.0% were obtained.

Preparation of Grain 4

The same proceduire used to prepare grain 2 was followed, except that the aqueous potassium iodide solution added by the controlled double jet method was added in an amount such that the silver iodide content was 0.3 mol % of the total silver amount. Thus, monodisperse silver iodobromide grains having a total silver iodide content of 0.4 mol %, an average projected area diameter of 1.10 μm, a thickness of 0.163 μm, and a variation coefficient of diameters of 18.5% were obtained.

Preparation of Grain 5

The same procedure used to prepare grain 2 was followed, except that the aqueous potassium iodide soluton in the controlled double jet step was not added and aqueous potassium bromide solution alone was added. Thus, monodisperse silver iodobromide grains having a total silver iodide content of 0.1 mol %, an average projected area diameter of 1.12 μm, a thickness of 0.165 μm, and a variation coefficient of diameters of 18.0% were obtained.

Preparation of Emulsions 2 to 5, Chemical Sensitization

Next, each of grains 2 to 5 prepared as described above was subjected to chemical sensitization with stirring at a constant temperature of 56° C.

That is, first, 0.043 mg of thiourea dioxide was added to the silver halide grains and the mixture was kept in this state for 20 minutes to impart thereto a reduction sensitization.

Then, 20 mg of 4-hydroxy-6-methyl-1,3,3a,7-tetraazaindene, 400 mg of the sensitizing dye I-1 and 4.2 mg of the sensitizing dye I-2 each as used in Example 1 were added to the silver halide grains, and furthermore, 0.83 g of an aqueous solution of calcium chloride was added thereto. Thereafter, 1.3 mg of sodium thiosulfate, 3.4 mg of the selenium compound-2 shown below, 2.6 mg of chloroauric acid, and 90 mg of potassium thiocyanate were added thereto and after 40 minutes, the system was cooled to 35° C.

Thus, the preparation of Emulsions 2 to 5 were completed.

SeleniumCompound-2:

-continued

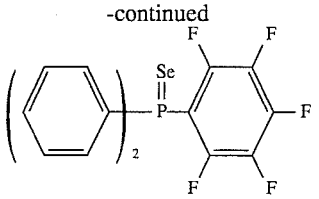

Then, by following the same procedure used to prepare the coated sample 4 in Example 1, coated samples 6 to 9 were prepared from Emulsions 2 to 5, respectively. Each of these samples was processed and evaluated as shown in Table 2 below.

Evaluation of Photographic Performance

The photographic performace of each coated sample was evaluated using the following processing compositions and the following automatic processor. The samples were light-exposed as in Example 1, and the sensitivity is given relative to that of sample 9.

Automatic Processor:

A CEPROS-M (trade name, made by Fuji Photo Film Co., Ltd.) automatic processor was used.

| Low-Pollution Type Developer: | |
|---|---|
| Part A: | |
| Potassium Hydroxide | 28.0 g |
| Sodium Sulfite | 75.0 g |
| Diethylenetriaminepentacetic Acid | 2.0 g |
| Sodium Carbonate | 30.0 g |
| hydroquinone | 18.0 g |
| Diethylaminoethyl-5-mercatotetrazole | 0.1 g |
| Potassium Bromide | 1.0 g |
| Water to make | 300 ml |
| Part B: | |
| Triethylene Glycol | 6.0 g |
| 5-Nitroindazole | 0.3 g |
| Acetic Acid | 40.0 g |
| 1-Phenyl-3-pyrazolidone | 3.5 g |
| Processing Assistant I (shown below) | 0.2 g |
| Water to make | 50 ml |
| Processing Assistant I | |
| $(S-CHCH_2COOH)_2$ | |
| Replenishing Ratio: | |
| Part A | 300 ml |
| Part B | 50 ml |
| Water | 650 ml |

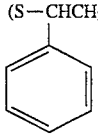

In this state, the COD was about 50,000 (pH adjusted to 10.3 with sodium hydroxide).

| (Low-Pollution Type Fix Solution) | |
|---|---|
| Part A: | |
| Ammonium Thiosulfate | 96.4 g |
| Ethylenediaminetetraacetic acid.Disodium.dihydrate | 0.025 g |
| Sodium Metabisulfite | 22.0 g |
| Water to make | 500 ml |
| Replenishing Ratio: | |
| Part A | 500 ml |
| Water | 500 ml |

In this state, the COD was about 40,000 (pH adjusted to 5.0 with sodium hydroxide).

Water was added to each replenisher to make 1 liter (pH adjusted to 5.0 with sodium hydroxide).

With the start of photographic processing, each of the processing solutions was filled in the respective tanks of the automatic processor.

Developer Tank: To 1 liter of the foregoing replenisher for the developer were added 4.0 g of potassium bromide and 3.5 g of acetic acid.

Fix Tank: One liter of the foregoing replenisher for the fix solution.

Processing Speed: Adjusted to provide a dry-to-dry time of 45 seconds.

Development Temperature: 35° C.

Fixing Temperature: 32° C.

Drying Temperature: 45° C.

Replenishing Amount:

Developer: 15 ml/10×12 $in^2$ sheet processed

Fix Solution: 20 ml/10×12 $in^2$ sheet processed

TABLE 2

| Sample | Emulsion | Content of AgI (*) | Melting Time (min) | Drying Marks | Photographic Perfor-mance | Roller Marks | Layer Thickness (μm) |
|---|---|---|---|---|---|---|---|
| 6 (Comparison) | 2 | 1.3 | 45 | B | 1.03 | D | 3.4 |
| 7 | 3 | 0.67 | " | B | 1.01 | D | " |

TABLE 2-continued

| Sample | Emulsion | Content of AgI (*) | Melting Time (min) | Drying Marks | Photographic Perfor-mance | Roller Marks | Layer Thickness (μm) |
|---|---|---|---|---|---|---|---|
| (Comparison) 8 | 4 | 0.4 | " | B | 1.00 | C | " |
| (Invention) 9 | 5 | 0.1 | " | B | 1.00 | A | " |
| (Invention) | | | | | | | |

(*): mol %/Ag-mol

As shown in Table 2, when the melting time and the layer thickness are within the scope of the present invention, the drying marks are acceptable for practical. However, in the coated samples (comparison samples) where the iodine content of the silver halide grains is more than 0.5 mol %/Ag-mol, the formation of roller marks becomes too extensive to be of practical use.

EXAMPLE 3

Preparation of Tabular Silver Iodobromide Grains Having a Silver Iodide Content of 0.1 mol % (Grain 6)

To an aqueous solution composed of 1 liter of water containing 6.2 g of gelatin (average molecular weight of 15,000) and 6.9 g pf potassium bromide kept at 40° C. were added an aqueous solution of 4.0 g of silver nitrate and an aqueous solution of 5.9 g of potassium bromide with stirring by a double jet method over a period of 37 seconds. Then, after adding thereto an aqueous solution containing 18.6 g of gelatin, the temperature of the mixture was raised to 60° C. while adding thereto an aqueous solution of 9.8 g of silver nitrate over a period of 22 minutes.

Furthermore, 5.9 ml of an aqueous 25% ammonia solution was added to the mixture and after 10 minutes had passed, an aqueous solution containing 5.5 g of acetic acid was added thereto. Thereafter, an aqueous solution of 151 g of silver nitrate and an aqueous solution of potassium bromide were added to the mixture by a controlled double jet method while keeping pAg at 8.8 over a period of 35 minutes. In this case, the above solutions were added at an accelerating flow rate so that the flow rate at the end of the addition was 14 times the flow rate at the beginning of the addition. After the end of the addition, 15 ml of an aqueous solution of 2N potassium thiocyanate was aded to the mixture. Thereafter, the temperature of the mixture was lowered to 35° C. and soluble salts were removed by a flocculation method. Then, the temperature was raised to 40° C., 35 g of gelatin, 85 mg of proxel, and a thickener were added thereto. The pH and pAg thereof were adjusted to 6.1 and 7.8, respectively, with sodium hydroxide and potassium bromide, and with an aqueous silver nitrate solution.

Then, the grains were subjected to chemical sensitization at a temperature of 56° C. That is, first, after adding thereto 3 mg of sodium ethylthiosulfonate, silver iodide fine grains having a mean grain size of 0.07 μm were added thereto in an amount of 0.1 mol % to the total silver amount. Thereafter, 0.04 mg of thiourea dioxide was added to the mixture and then 40 mg of 4-hydroxy-6-methyl-1,3,3a, 7-tetraazaindene and 463 mg of the sensitizing dye I-1 as used in Example 2 were added to the mixture. After 10 minutes had passed, $0.52\times10^{-5}$ mol/mol-Ag of the selenium compound-2 as used in Example 2, $1.03\times10^{-5}$ mol/mol-Ag of sodium thiosulfate, 30 mg of potassium thiosulfate, and 6 mg of chloroauric acid were added to the silver halide emulsion obtained and the silver halide emulsion was ripened for 50 minutes. Thereafter, the emulsion was quickly cooled and solidified.

In the silver halide emulsion thus obtained, 93% of the total projected areas of the total silver halide grains were composed of tabular silver halide grains having an aspect ratio of at least 3, and all of the tabular silver halide grains having an aspect ratio of at least 3 had an average projected area diameter of 0.83 μm, a standard deviation of 15%, an average thickness of 0.14 μm, and an average aspect ratio of 6.2.

Preparation of Cubic Silver Iodobromide Grains having a Silver Iodide Content of 0.1 mol % (Grain 7)

To an aqueous solution composed of 860 ml of water containing 31.7 g of gelatin (average molecular weight of 70,000), 3.2 g of sodium p-methylphenylsulfinate.Tetrahydrate, 5.3 mg of sodium thiosulfate, and 1.1 g of acetic acid kept at 55° C. was added 4.8 ml of an aqueous solution of 25 % ammonia with stirring. Thereafter, 2.5 ml of an aqueous 1% silver nitrate solution was added to the mixture, and further more 8 ml of an aqueous solution of 1% potassium bromide was added thereto. Thereafter, an aqueous solution of 165 g of silver nitrate and aqueous solution of potassium bromide were added to the mixture by a controlled double jet method while keeping the pontential at pAg 7.8 over a period of 60 minutes at a constant flow rate of the silver nitrate solution. After finishing the addition, 15 ml of an aqueous solution of 2N sodium thiocyanate was added thereto.

Then, after lowering the temperature to 35° C. and removing soluble salts by a flucculation method, the temperature was raised to 40° C., 35 g of gelatin, 85 mg of proxel, and a thickener were added to the mixture the pH and pAg thereof were adjusted to 6.1 and 7.8, respectively, with sodium hydroxide and potassium bromide, and with an aqueous silver nitrate solution.

Then, chemical sensitization was applied to the silver halide grains thus formed with stirring at a constant temperature of 56° C. That is, first, silver iodide fine grains having a mean grain size of 0.07 μm were added thereto in an amount of 0.1 mol % of the total silver amount. Thereafter, 0.04 mg of thiourea dixode was added and further more 40 mg of 4-hydroxy-6-methyl-1,3,3a,7-tetraazaindene, and 463 mg of the sensitizing dye I-1 as used in Example 2 were added to the mixture. After 10 minutes had passed, $0.52\times10^{-5}$ mol/mol-Ag of the selenium compound-2 as used in Example 2, $1.03\times10^{-5}$ mol/mol-Ag of sodium thiosulfate, 30 mg of potassium thiocyanate, and 6 mg of chloroauric acid were added to the silver halide grains, and the grains were ripened for 50 minutes. Thereafter, the silver halide emulion thus obtained was quickly cooled and solidifed. The silver halide emulsion thus obtained contained cubic silver iodobromide grains having a mean grain size of 0.55 μm and a standard deviation of 10%.

Preparation of Octahedral Silver Iodobromide Grains

Having a Silver Iodide Content of 0.1 mol % (Grain 8)

To an aqueous solution formed by dissolving 33 g of gelatin (average molecular weight of 70,000) and 0.22 g of potassium bromide in 747 ml of water and kept at 75° C. were added 31 ml of an aqueous solution of 0.083 mol/liter of silver nitrate (solution 1) and 31 ml of an aqueous solution of 0.088 mol/liter of potassium bromide (solution 2) with stirring over a period of 10 minutes. Then, 152 ml of solution 1 and 152 ml of solution 2 were further added thereto by an ordinary double jet method over a period of 7 minutes. Then, after adding thereto 1.2 g of potassium bromide, 871 ml of an aqueous solution of 0.82 mol/liter of silver nitrate (solution 3) was added thereto while accelerating the flow rate from an initial flow rate of 1.6 ml/minute over a period of 78 minutes. At the same time, an aqueous solution of 0.9 mol/liter of potassum bromide (solution 4) was added thereto while controlling the silver potential to 0 mV (with respect to a saturated calomel electrode). Furthermore, 498 ml of an aqueous solution of 0.51 mol/liter of silver nitrate (solution 5) and 498 ml of an aqueous solution of 0.51 mol/liter of potassium bromide (solution 6) were added thereto at a constant flow rate over a period of 24 minutes. After completing the addition, the temperature of the system was raised to 35° C. and after removing soluble salts by an ordinary floccuration method, additional gelatin was added at 40° C. Thereafter, the pH and pAg thereof were adjusted to 6.1 and 7.8, respectively with sodium hydroxide and potassium bromide, and with an aqueous silver nitrate solution.

Then, chemical sensitization was applied to the silver halide grains with stirring at a constant temperature of 56° C. That is, first, 7.2 mg of sodium thiosulfonate and silver iodide fine grains having an average diameter of 0.07 μm in an amount of 0.1 mol % to the total silver amount were added thereto. Then, 20 mg of 4-hydroxy-6-methyl-1,3,3a, 7-tetraazaindene, 400 mg of the sensitizing dye I-1 and 4.2 mg of the sensitizing dye I-2 each as used in Example 1 were added to the mixture. Furthermore, 0.83 g of an aqueous solution of calcium chloride was added thereto. Thereafter, 1.3 mg of sodium thiosulfate, 3.4 mg of the selenium compound-2 as used in Example 2, 2.6 mg of chloroauric acid, and 90 mg of potassium thiocyanate were added thereto and after 40 minutes, the silver halide emulsion formed was cooled to 35° C.

Thus, monodisperse octahedral silver iodobromide grains having an average projected area diameter of 0.8 μm, a variation coefficient of 10%, and a silver iodide content of 0.1 mol % were obtained.

Using the silver halide emulsion thus prepared, the amount of gelatin in the coated emulsion layer was controlled to provide a layer thickness as shown in Table 3 below. Also, the amount of the hardening agent was controlled to provide a melting time of 45 minutes. Furthermore, the addition amount of sodium polyacrylate was controlled so that the coated amount per square meter was the same for the surface protective layer and the silver halide emulsion layer and the swelling ratio was 230%.

The surface protective layer and the silver halide emulsion layer were coated on both surfaces of a support by the simultaneous extrusion method as in Example 1 to provide coated samples 10 to 20.

The coated silver amount per side of the support was 1.70 g/m$^2$. The covering power was obtained by dividing the density (where the density is obtained by subtracting the density of the support from the density at the maximum density portion formed by processing as in Example 1) by the developed silver amount. The exposure and processing were conducted as in Example 1.

Evaluation of Drying Property

Each coated sample at the outlet of the drying zone for a dry-to-dry processing time of 30 seconds was functionally evaluated by touching as follows.

A: Well dried

B: Wet to the touch and problematic

The evaluation results are shown in Table 3.

TABLE 3

| Sample | Emul-sion | Layer Thickness (μm) | Swelling Ratio (%) | Cover-ing Power | Drying Marks | Drying Prope-rty | Melting Time (min.) | Roller Marks |
|---|---|---|---|---|---|---|---|---|
| 10 (Invention) | 6 | 3.2 | 230 | 1.16 | B | A | 45 | C |
| 11 (Invention) | " | 3.5 | " | " | B | A | " | B |
| 12 (Invention) | " | 3.7 | " | " | A | A | " | B |
| 13 (Comparison) | " | 3.9 | " | " | A | B | " | A |
| 14 (Comparison) | " | 4.1 | " | " | A | B | " | A |
| 15 (Invention) | 7 | 3.2 | " | 0.95 | C | A | " | C |
| 16 Invention) | " | 3.7 | " | " | B | A | " | B |
| 17 (Comparison) | " | 3.9 | " | " | A | B | " | B |
| 18 (Invention) | 8 | 3.2 | " | 0.83 | C | A | " | C |
| 19 (Invention) | " | 3.7 | " | " | B | A | " | B |
| 20 (Comparison) | " | 3.9 | " | " | A | B | " | B |

As shown in Table 3, the coated samples (comparison samples) having a layer thickness not less than 3.8 μm emmerged from the drying zone in a wet state, and were not practically usable. On the other hand, when various silver halide grains such as tabular silver halide grains, cubic silver halide grains, octahedral silver halide grains, etc., were used, the samples of the present invention having a iodide content of not more than 0.5 mol %, a melting time of at least 30 minutes, and a layer thickness of less than 3.8 μm exhibited adequate performance in the drying property, the formation of drying marks, and the formation of roller marks. These results clearly demonstrate the effects of the present invention.

While the invention has been described in detailed with reference to specific embodiments, it will be apparent to one skilled in the art that various changes and modifications can be made to the invention without departing from its spirit and scope.

What is claimed is:

1. A silver halide photographic material comprising a support having provided thereon one or more hydrophilic colloid layers, at least one of which is a silver halide emulsion layer comprising a silver halide emulsion containing silver halide grains, wherein the silver halide grains contained in the at least one silver halide emulsion layer have a silver iodide content of not more than 0.5 mol %, the silver halide photographic material has a melting time of not less than 45 minutes, and the total thickness of constituent hydrophilic layers per each side of the support having thereof the at least one silver halide emulsion layer is less than 3.8 μm.

2. The silver halide photographic material of claim 1, wherein the at least one silver halide emulsion layer is provided on both sides of the support.

3. The silver halide photographic material of claim 1, wherein at least 50% (projected area) of the silver halide grains contained in the at least one silver halide emulsion layer are composed of tabular silver halide grains having an aspect ratio of at least 3.

4. The silver halide photographic material of claim 1, wherein the silver halide grains contained in all of the silver halide emulsion layers of the photographic material have a silver iodide content of not more than 0.5 mol %.

5. The silver halide photographic material of claim 3, wherein the tabular silver halide grains have a projected area diameter of from 0.3 to 2.0 μm.

6. The silver halide photographic material of claim 3, wherein the tabular silver halide grains have an aspect ratio of from 3 to less than 20.

7. The silver halide photographic material of claim 1, wherein the hydrophilic colloid layers constituting the photographic material have a swelling ratio of 280% or lower.

8. The silver halide photographic material of claim 7, wherein the swelling ratio of the hydrophilic colloid layers constituting the photographic material is from 200 to 280%.

9. The silver halide photographic material of claim 2, wherein the photographic material is a black-and-white X-ray photographic material for medical use.

10. The silver halide photographic material of claim 1, wherein the silver halide photographic material has a melting time of not less than 70 minutes.

11. The silver halide photographic material of claim 1, wherein the silver halide grains contained in the at least one silver halide emulsion layer have a silver iodide content of not more than 0.3 mol %.

12. The silver halide photographic material of claim 1, wherein the silver halide grains contained in the at least one silver halide emulsion layer have a silver iodide content of from 0.01 to 0.15 mol %.

13. The silver halide photographic material of claim 1, wherein the total thickness of constituent hydrophilic layers per each side of the support having thereon the at least one silver halide emulsion layer is less than 3.4 μm.

* * * * *